Oct. 12, 1943.  W. J. TAYLOR  2,331,814

SEAM FOR WOVEN WIRE FABRICS AND METHOD OF MAKING SAME

Filed Feb. 6, 1943

INVENTOR.
WILLIAM J. TAYLOR
BY
*Geo. A. Senior*
ATTORNEY

Patented Oct. 12, 1943

2,331,814

UNITED STATES PATENT OFFICE 2,331,814

SEAM FOR WOVEN WIRE FABRICS AND METHOD OF MAKING SAME

William J. Taylor, Nutley, N. J., assignor to Wilson Wire Works, Inc., Kearny, N. J., a corporation of New Jersey Application February 6, 1943, Serial No. 475,041

4 Claims. (Cl. 245—10)

The invention has to do with a seam for woven wire fabrics and a method of making same. The woven wire fabric is of a type used for forming an endless belt for use on Fourdrinier machines or other paper or board machines.

It is a well known fact in this art that the seam has been one of the gravest problems. If it is made unduly bulky for reasons of strength the wire loses flexibility in the region of the seam and this causes undue wear and tear on the parts of the machine. This condition also causes improper drainage in the seam region which results in imperfections of the paper at this area. It further causes marking of the paper which is a very serious matter, particularly in the finer grades of paper. If the seam does not have sufficient strength it will break long before the wire has outlived its usefulness. As these wires are highly expensive this is a serious matter.

The object of the present invention is to provide a seam which is exceedingly strong, durable, simple in construction, economical to manufacture, and one that will not break or tear during the useful life of the wire. In addition the drainage is not materially affected in the region of the seam nor will the seam cause any marking on the paper. The invention also has to do with the method of making such a seam.

The invention will be fully described in the following specification and illustrated in the drawing forming a part and in which.

Figures 1, 2:
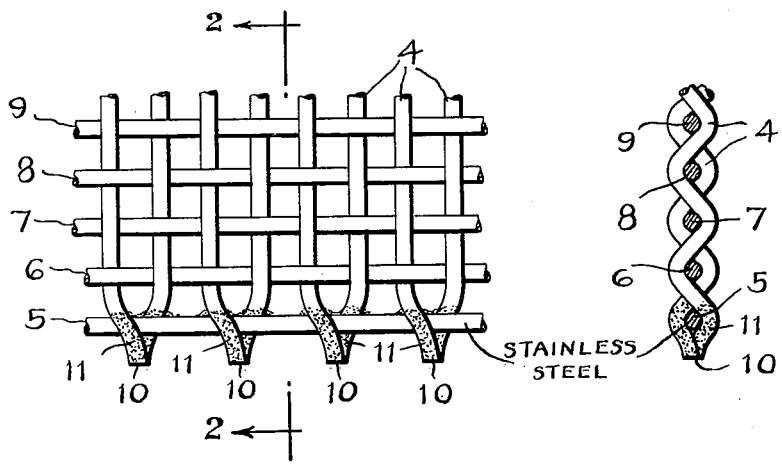
Fig. 1 is a plan view on a large scale of a portion of one end of a woven wire belt before it has been joined to the other end.
Fig. 2 is a sectional view taken on the line 2—2 of Fig. 1.

Referring again to said drawing the warp wires are designated by the reference numeral 4 and the weft wires by the numerals 5, 6, 7, 8 and 9. The weft wires 6, 7, 8, 9 and all other weft wires in the wire belt are made of copper or a copper material such as bronze, brass or other suitable alloys. As is well known wires of this nature are comparatively soft. One of the important aspects of the invention is that the last weft wire 5 is made of stainless steel.

In preparing the wire fabric prior to forming the seam the last weft wire is removed and the stainless steel weft wire 5 is substituted therefor.

The ends of the warp wires are brought together in pairs as indicated at 10, each pair comprising an upper and lower warp wire. The ends of each pair of warp wires are joined or brazed together by silver solder as indicated at 11. The silver solder may be applied in various ways. One way that has been found successful is to place a silver solder weft wire alongside of the stainless steel weft wire and then by the use of a torch blow-pipe melt the solder to join the ends together. The silver solder will not adhere to the stainless steel warp wire thus avoiding the possibility of impairing the drainage.

The joined ends 10 of the pairs of warp wires form in effect what might be termed brazing lumps or brazing knots. These lumps or knots in conjunction with the stainless steel weft wire provide exceedingly strong and durable ends for joining together to form the seam for the woven wire belt.

Figure 3:
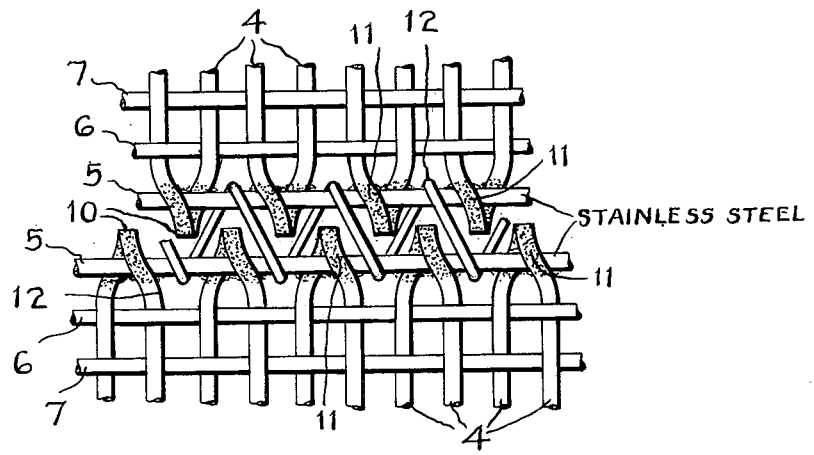
Fig. 3 is a fragmentary plan view showing one method of connecting the ends of the woven wire belt together.

After both ends of the wire belt have been properly prepared they are secured together by a closing wire 12. As illustrated in Fig. 3 the closing wire is laced over the two stainless steel end weft wires. The stainless steel weft wires being tough and strong and the welding lumps or knots imparting additional strength the closing wire will positively be retained and the wire belt will not break or tear at the seam.

Figure 4:
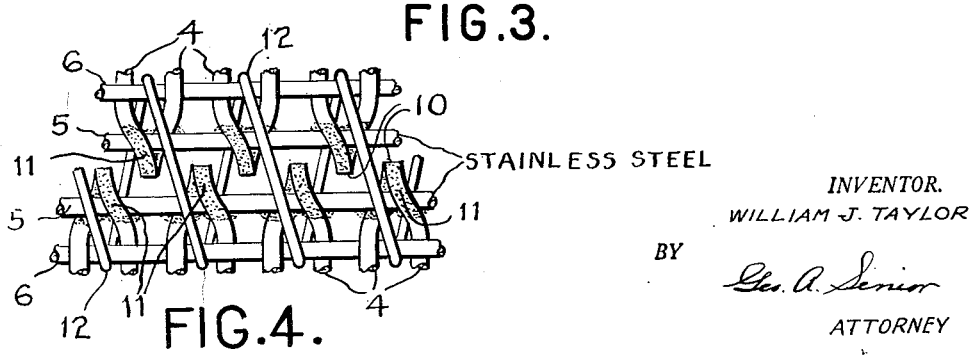
Fig. 4 is a fragmentary plan view disclosing another method of connecting the ends of the woven wire belt together.

Fig. 4 illustrates a seam in which the closing wire 12 is laced over the weft wires next to the stainless steel end weft wires. In this type of seam it is preferable to lead the closing wire right behind the brazing lumps 10 and not through the openings between the brazing lumps. With this arrangement the closing wire will be held not only by the stainless steel wire but by the brazing knots as well. When the wire belt is installed on the machine with the seam made in accordance with Fig. 4 the weft wires over which the closing wire is laced, being of comparatively soft material, will be drawn toward the stainless steel weft wires and thus the stainless steel last weft wires and the brazing lumps will carry the load and retain the closing wire to insure the seam remaining intact for the life of the wire. If desired the closing wire 12 in Fig. 3 might be led behind the brazing lumps 10. However this might have a tendency to make the seam a trifle bulky and entirely satisfactory results have been obtained with the illustrated arrangement. In order to aid in illustrating the invention the drawing has been made on a considerably enlarged scale as in actual practice the wires are quite thin and the mesh is very fine.

In ordinary practice with sewed seams, stitching wires are looped through the weft wires for a number of weft wires back from the last wires in order to reinforce the ends of the wire belt for the application of the closing wire. This is a complicated and time taking operation and makes for considerable bulkiness in the region of the seam, thus greatly impairing the drainage and causing marking of the paper. It has been found in actual practice that a seam of this nature does not have nearly the life of a seam made in accordance with applicant's invention in which the last weft wires are made of stainless steel.

I claim:

1. A seam for a woven wire belt having warp wires and weft wires formed of a copper material, the last weft wire in each end of the belt where the seam is to be formed being made of stainless steel, the ends of said warp wires extending beyond said stainless steel weft wires having their adjacent ends soldered together in pairs, each pair including an upper and lower warp wire, and a closing wire being laced through the ends of the belt to form the seam.

2. The method of making a seam for a woven wire belt, comprising the removal of the last weft wires in the ends of the belt, substituting a stainless steel weft wire for each of said last weft wires, brazing the ends of the warp wires extending beyond the stainless steel weft wires together in pairs, and lacing a closing wire through the ends of the belt beyond said stainless steel wires to form the seam.

3. A seam for a woven wire fabric having warp wires and weft wires formed of a copper material, the last weft wire in each end of the belt where the seam is to be formed being made of stainless steel, the ends of said warp wires extending beyond said stainless steel weft wires having their adjacent ends soldered together in pairs to form brazing lumps, each pair including an upper and lower warp wire, and a closing wire laced over the two stainless steel end weft wires.

4. A seam for a woven wire fabric having warp wires and weft wires formed of a copper material, the last weft wire in each end of the belt where the seam is to be formed being made of stainless steel, the ends of said warp wires extending beyond said stainless steel weft wires having their adjacent ends soldered together in pairs to form brazing lumps, each pair including an upper and lower warp wire, and a closing wire laced over the weft wires next to the stainless steel end weft wires and behind the brazing lumps.

WILLIAM J. TAYLOR.